United States Patent
Ohno et al.

(10) Patent No.: US 6,991,862 B2
(45) Date of Patent: Jan. 31, 2006

(54) MAGNETIC RECORDING MEDIUM

(75) Inventors: Mikio Ohno, Odawara (JP); Tatsuo Ishikawa, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/810,830

(22) Filed: Mar. 29, 2004

(65) Prior Publication Data

US 2004/0219393 A1 Nov. 4, 2004

(30) Foreign Application Priority Data

Apr. 16, 2003 (JP) .............................. 2003-111606

(51) Int. Cl.
*G11B 5/702* (2006.01)
(52) U.S. Cl. ................. 428/840.6; 428/844.8
(58) Field of Classification Search ................ 428/328, 428/336, 425.9, 694 BA, 694 BU, 694 BL, 428/840.6, 844.8
See application file for complete search history.

(56) References Cited

FOREIGN PATENT DOCUMENTS

| EP | 1022726 A1 | 7/2000 |
|----|------------|--------|
| EP | 1207522 A | 5/2002 |

*Primary Examiner*—Stevan A. Resan
(74) *Attorney, Agent, or Firm*—Sughrue Mion, PLLC

(57) ABSTRACT

In one aspect, the magnetic recording medium comprises a magnetic layer comprising a ferromagnetic powder and a binder and said binder comprises polyurethane resin having a glass transition temperature of 100 to 200° C. In a second aspect, the magnetic recording medium comprises a nonmagnetic layer comprising a nonmagnetic powder and a binder and a magnetic layer comprising a ferromagnetic powder and a binder in this order on a nonmagnetic support and at least the binder comprised in said magnetic layer comprises polyurethane resin having a glass transition temperature of 100 to 200° C. In both aspects, said magnetic layer has a thickness equal to or less than 0.15 $\mu$m, said ferromagnetic powder has a mean major axis length or a mean plate diameter of 60 nm or less, and said magnetic layer has a coercivity of 159 to 239 kA/m in a longitudinal or in-plane direction.

9 Claims, No Drawings

MAGNETIC RECORDING MEDIUM

FIELD OF THE INVENTION

The present invention relates to a particulate magnetic recording medium, and more particularly, to a magnetic recording medium that is suited to high-density recording and has both good durability and electromagnetic characteristics.

BACKGROUND OF THE INVENTION

Magnetic recording media are widely employed in areas such as recording tapes, video tapes, and floppy disks. Particulate magnetic recording media have a layer configuration comprising a nonmagnetic support over which is formed a magnetic layer comprising a ferromagnetic powder and a binder. High levels of various characteristics are demanded of particulate magnetic recording media, such as electromagnetic characteristics, running durability, and running properties. That is, a greater ability to reproduce the original sound is demanded of audio tapes employed in the recording and reproduction of music, and good ability to reproduce an original image and good electromagnetic characteristics are demanded of video tapes.

By contrast, magnetic recording media having a magnetic layer imparted with high coercivity are known to afford good electromagnetic characteristics; for example, see Japanese Unexamined Patent Publication (KOKAI) No. 2000-268343. This magnetic recording medium sets the ratio (Hc/Br) of coercivity (Hc) to residual magnetic flux density (Br) in the magnetic layer to the range from 560 to 1240 kA/(T·m) and sets the coercivity (Hc) in the magnetic layer to the range from 159 to 239 kA/m to achieve good electromagnetic characteristics.

However, in an environment demanding better durability, such as when recording and reproducing with a magnetic head rotating at high speed, even the magnetic recording medium described in Japanese Unexamined Patent Publication (KOKAI) No. 2000-268343 does not afford fully satisfactory durability. In particular, in the devices employed in the high-density recording of recent years, the speed at which the magnetic head rotates has been increased. In digital video tape recorders, the rotational speed of the magnetic head is at least 9,600 rpm. Since such rotational speeds are far greater than the 1,800 rpm of popular analog video tape recorders and the 5,000 rpm of professional devices, the rate at which the magnetic head slides over the magnetic recording medium is quite high.

Accordingly, when recording and reproduction are conducted with such a magnetic head rotating at high speed on the magnetic recording medium of Japanese Unexamined Patent Publication (KOKAI) No. 2000-268343, it is necessary to further enhance the durability of the magnetic recording medium of Japanese Unexamined Patent Publication (KOKAI) No. 2000-268343.

SUMMARY OF THE INVENTION

The present invention devised to solve the above-stated problems. It is an object of the present invention to provide a magnetic recording medium having both good running durability and good electromagnetic characteristics.

To achieve the above-stated object, the present inventors conducted extensive research into means of achieving a stable error rate in a high-density magnetic recording medium. As a result, they successfully obtained a magnetic recording medium having both good running durability, even in an environment demanding durability, and good electromagnetic characteristics by incorporating into at least a magnetic layer a binder comprising polyurethane resin having a glass transition temperature ranging from 100 to 200° C. and employing a ferromagnetic powder having a small mean major axis length or mean plate diameter and high coercivity into a thin magnetic layer; the present invention was devised on this basis.

That is, the aforementioned object is achieved by:

a magnetic recording medium comprising a magnetic layer comprising a ferromagnetic powder and a binder, wherein said binder comprises polyurethane resin having a glass transition temperature ranging from 100 to 200 °C., said magnetic layer has a thickness equal to or less than 0.15 μm, said ferromagnetic powder has a mean major axis length or a mean plate diameter equal to or less than 60 nm, and said magnetic layer has a coercivity (Hc) ranging from 159 to 239 kA/m in a longitudinal direction or an in-plane direction.

The aforementioned object is also achieved by:

a magnetic recording medium comprising a nonmagnetic layer comprising a nonmagnetic powder and a binder and a magnetic layer comprising a ferromagnetic powder and a binder in this order on a nonmagnetic support, wherein at least the binder comprised in said magnetic layer comprises polyurethane resin having a glass transition temperature ranging from 100 to 200° C., said magnetic layer has a thickness equal to or less than 0.15 μm, said ferromagnetic powder has a mean major axis length or a mean plate diameter equal to or less than 60 nm, and said magnetic layer has a coercivity (Hc) ranging from 159 to 239 kA/m in a longitudinal direction or an in-plane direction.

In the aforementioned magnetic recording medium, it is preferable that:

(1) the polyurethane resin is obtained by using a diol compound represented by the following general formula:

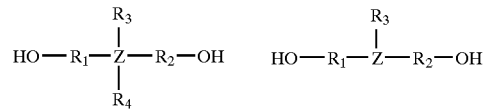

(where Z is a ring structure selected from the group consisting of a cyclohexane ring, a benzene ring, and a naphthalene ring, $R_1$ and $R_2$ are respectively an alkylene group having 1 to 18 carbon atoms, and $R_3$ and $R_4$ are respectively an alkyl group having 2 to 18 carbon atoms);

(2) the polyurethane resin has a urethane group concentration ranging from 2.5 to 6.0 mmol/g;

(3) the polyurethane resin has a weight average molecular weight (Mw) ranging from 30,000 to 200,000;

(4) the polyurethane resin comprises at least one polar group selected from the group consisting of —$SO_3M$, —$OSO_3M$, —$PO_3M_2$, and —COOM (where M is selected from the group consisting of a hydrogen atom, alkali metal and ammonium) in an amount of $1 \times 10^{-5}$ to $2 \times 10^{-4}$ eq/g;

(5) the polyurethane resin has a glass transition temperature ranging from 120 to 170° C.;

(6) the magnetic layer has a thickness ranging from 20 to 100 nm;

(7) the magnetic layer has a coercivity ranging from 159 to 207 kA/m in a longitudinal direction or in-plane direction; and (8) the ferromagnetic powder has a mean major axis length or a mean plate diameter ranging from 20 to 50 nm.

The magnetic recording medium of the present invention employs polyurethane resin having a high Tg in the magnetic layer. This yields a magnetic recording medium having good running durability that tends not to deteriorate or decompose even in a particularly high-temperature environment. Further, since the magnetic recording medium of the present invention employs a fine ferromagnetic powder having high coercivity in a thin magnetic layer, a high S/N ratio and PW50 (the pulse half-width) can be optimized, resulting in a stable error rate.

The magnetic layer, nonmagnetic layer, nonmagnetic support, backcoat layer, undercoat layer, manufacturing method, and physical characteristics of the magnetic recording medium of the present invention will be described in detail below.

[Magnetic Layer]

<Polyurethane Resin with a Tg of 100 to 200° C.>

In the magnetic recording medium of the present invention, at least the binder employed in the magnetic layer comprises polyurethane resin having a Tg ranging from 100 to 200° C.

Employing a binder comprising polyurethane resin having a high Tg in at least the magnetic layer in the present invention inhibits plastic flow of the magnetic layer due to heat of friction produced by sliding of the recording and reproducing heads on the surface of the magnetic layer, resulting in good coating strength and good running durability. This effect is particularly marked in a thin magnetic layer. Employing a resin comprising the above polyurethane resin in the nonmagnetic layer is desirable to prevent damaging the tape edge surface through contact between the edge of the tape and the tape position regulating guide in a recorder.

The Tg of the polyurethane resin comprised in the binder in the present invention falls within a range of 100 to 200° C., preferably a range of 120 to 170° C. A Tg of equal to or greater than 100° C. permits good running durability without a decrease in coating strength. Further, a Tg of equal to or less than 200° C. results in a smoothing effect during calendering and yields good electromagnetic characteristics and running durability.

The polyurethane resin preferably has a urethane group concentration falling within a range of 2.5 to 6.0 mmol/g, more preferably 3.0 to 4.5 mmol/g. A urethane group concentration of equal to or greater than 2.5 mmol/g yields a coating with a high Tg and good durability, while at equal to or less than 6.0 mmol/g, high solvent solubility can be achieved, resulting in good dispersibility. An excessively high urethane group concentration necessarily precludes the incorporation of polyol groups, thus rendering control of molecular weight difficult, and is therefore undesirable from the perspective of synthesis.

The weight average molecular weight (Mw) of the polyurethane resin preferably falls within a range of 30,000 to 200,000, more preferably a range of 50,000 to 100,000. A molecular weight of equal to or greater than 30,000 results in high coating strength and good durability, while a molecular weight of equal to or less than 200,000 affords high solvent solubility and good dispersibility.

A polar group in the polyurethane resin in the form of —$SO_3M$, —$OSO_3M$, —$PO_3M_2$, or —COOM is desirable, with the preference of —$SO_3M$ and —$OSO_3M$ (where M is selected from the group consisting of a hydrogen atom, alkali metal, and ammonium). The content of polar groups preferably ranges from $1 \times 10^{-5}$ to $2 \times 10^{-4}$ eq/g. At equal to or greater than $1 \times 10^{-5}$ eq/g, good adsorption to a ferromagnetic powder and a nonmagnetic powder as well as good dispersibility can be achieved. A content of equal to or less than $2 \times 10^{-4}$ eq/g results in good solvent solubility and dispersibility.

The content of OH groups in the polyurethane resin is preferably from 2 to 20 groups per molecule, more preferably 3 to 15 groups per molecule. The incorporation of two or more OH groups per molecule results in good reaction with the isocyanate curing agent, thereby resulting in high coating strength and good durability. A content of OH groups of equal to or less than 15 groups per molecule results in high solvent solubility and good dispersibility. Examples of compounds that can be used to contribute OH groups are compounds having three or more functional groups in the form of OH groups, such as trimethylolethane, trimethylolpropane, trimellitic anhydride, glycerin, pentaerythritol, hexanetriol, and branching polyester or polyetherester having three or more functional groups in the form of OH groups. Of these, the trifunctional compounds are preferred. Tetrafunctional and above compounds react too fast with the curing agent, resulting in shorted pot life.

The polyol component of the polyurethane resin comprised in the binder in the present invention can be a known polyol such as a polyester polyol, polyether polyol, polycarbonate polyol, polyetherester polyol, polyolefin polyol, dimer diol, or some other cyclic or long-alkyl-chain diol compound.

The molecular weight of the polyol is preferably about 500 to 2,000. A molecular weight falling within this range permits a substantial increase in the weight ratio of diisocyanates, resulting in increased urethane bonds, enhanced interaction between molecules, and thus a coating of a high glass transition temperature and high mechanical strength can be achieved.

The diol component is preferably a diol compound having a cyclic structure and a long alkyl chain. Here, the term "long alkyl chain" refers to an alkyl group having 2 to 18 carbon atoms. A cyclic structure and long alkyl chains result in a curved structure and thus good solubility in solvents. Thus, the urethane molecular chains adsorbed on the surface of the magnetic and nonmagnetic material in the coating liquid can spread out widely, enhancing dispersion stability and yielding good electromagnetic characteristics. The cyclic structure permits obtaining polyurethane having a high glass transition temperature.

The following diol compounds are particularly preferred as diol compounds having a cyclic structure and long alkyl chains.

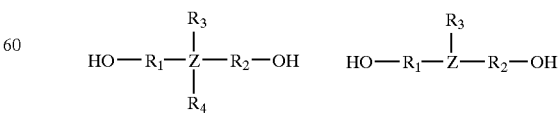

In the above formula, Z is a ring structure selected from the group consisting of a cyclohexane ring, a benzene ring, and a naphthalene ring, $R_1$ and $R_2$ are respectively an alkylene group having 1 to 18 carbon atoms, and $R_3$ and $R_4$ are respectively an alkyl group having 2 to 18 carbon atoms.

The diol component is preferably comprised in a proportion of 10 to 50 weight percent, more preferably 15 to 40 weight percent, in the polyurethane resin. A content of equal to or greater than 10 weight percent results in high solvent solubility and good dispersibility, while a content of equal to or less than 50 weight percent results in a coating film with a high Tg and good durability.

Diol components other than those described above can be additionally employed as a chain-extending agent in the polyurethane resin. The greater the magnetic weight of the diol component, the lower the diisocyanate content necessarily becomes, with few urethane bonds in the polyurethane resulting in deterioration of coating strength. Thus, to achieve adequate coating strength, it is desirable to further employ a chain-extending agent in the form of a low molecular weight diol having a molecular weight of less than 500, preferably equal to or less than 300.

Specific examples suitable for use are: ethylene glycol, 1,3-propanediol, propylene glycol, neopentyl glycol (NPG), 1,4-butanediol, 1,5-pentanediol, 1,6-hexanediol, 1,8-octanediol, 1,9-nonanediol, 2,2-dimethyl-1,3-propanediol, 2-ethyl-2-butyl-1,3-propanediol, 2,2-diethyl-1,3-propanediol, other aliphatic glycols, cyclohexanedimethanol (CHDM), cyclohexanediol (CHD), hydrogenated bisphenol A (H-BPA), other alicyclic glycols and their ethylene oxide adducts, propylene oxide adducts, bisphenol A (BPA), bisphenol S, bisphenol P, bisphenol F, other aromatic glycols and their ethylene oxide adducts, and propylene oxide adducts. The compound of preference is hydrogenated bisphenol A.

Known polyisocyanates may be employed in the polyurethane resin. Specific examples of desirable polyisocyanates are: TDI (tolylene triisocyanate), MDI (diphenylmethane diisocyanate), p-phenylene diisocyanate, o-phenylene diisocyanate, m-phenylene diisocyanate, xylylene diisocyanate, hydrogenated xylylene diisocyanate, and isophorone diisocyanate.

In the present invention, the polyurethane resin may be employed in combination with a vinyl chloride-based synthetic resin. The degree of polymerization of vinyl chloride-based resins suitable for such use is preferably from 200 to 600, more preferably from 250 to 450. The vinyl chloride-based resin may be copolymerized with a vinyl-based monomer such as vinyl acetate, vinyl alcohol, vinylidene chloride, or acrylonitrile.

In addition to a vinyl chloride-based resin, various synthetic resins may be employed in the polyurethane resin. Examples of such synthetic resins are: ethylene-vinyl acetate copolymers, cellulose derivatives such as nitrocellulose resin, acrylic resins, polyvinyl acetal resins, polyvinyl butyral resins, epoxy resins, and phenoxy resins. These may be employed singly or in combination.

When employing one of the above synthetic resins in combination with the polyurethane resin, the content of the polyurethane resin comprised in the magnetic layer preferably ranges from 10 to 90 weight percent, more preferably from 20 to 80 weight percent, further preferably from 25 to 60 weight percent of the binder. The content of the vinyl chloride-based resin preferably ranges from 10 to 80 weight percent, more preferably 20 to 70 weight percent, and further preferably 30 to 60 weight percent of the binder.

Curing agents such as polyisocyanate compounds can also be employed in the binder in the present invention. Examples of such polyisocyanate compounds are: the reaction products of 3 moles of tolylene diisocyanate and 1 mole of trimethylolpropane (for example, Desmodule L-75 (made by Bayer)); the reaction products of 3 moles of a diisocyanate such as xylylene diisocyanate or hexamethylene diisocyanate with 1 mole of trimethylol propane; buret adduct compounds of 3 moles of hexamethylene diisocyanate; isocyanurate products of 5 moles of tolylene diisocyanate; isocyanurate adduct products of 3 moles of tolylene diisocyanate and 2 moles of hexamethylene diisocyanate, and polymers of isophorone diisocyanate and diphenylmethane diisocyanate.

The content of the polyisocyanate compound comprised in the magnetic layer preferably ranges from 10 to 50 weight percent, more preferably 20 to 40 weight percent of the binder. When curing by electron-beam irradiation, compounds having reactive double bonds such as urethane acrylate can be employed. The total weight of the resin component and curing agent (that is, the weight of the binder) normally preferably falls within a range of 15 to 40 weight parts, more preferably 20 to 30 weight parts, per 100 weight parts of ferromagnetic powder.

<Ferromagnetic Powder>

The mean major axis length or mean plate diameter of the ferromagnetic powder employed in the magnetic layer in the present invention is equal to or less than 60 nm. A fine ferromagnetic powder having a mean major axis length or mean plate diameter of equal to or less than 60 nm, preferably from 20 to 50 nm, and more preferably 20 to 40 nm, yielding a higher S/N ratio is employed to achieve a stable error rate in the present invention.

The ferromagnetic power employed in the magnetic layer in the present invention is not specifically limited other than that it has a mean major axis length or mean plate diameter of equal to or less than 60 nm and a prescribed coercivity, set forth further below. Examples of ferromagnetic powders suitable for use in the present invention are ferromagnetic metal powders having a mean major axis length of equal to or less than 60 nm and hexagonal ferrite ferromagnetic powders having a mean plate diameter of equal to or less than 60 nm.

(Ferromagnetic Metal Powder)

The ferromagnetic metal powder employed in the magnetic layer in the present invention is preferably cobalt-containing ferromagnetic iron oxide or ferromagnetic alloy powder having a $S_{BET}$ specific surface area of 40 to 80 m$^2$/g, more preferably 50 to 70 m$^2$/g. The crystallite size preferably ranges from 12 to 25 nm, more preferably from 13 to 22 nm, and further preferably from 14 to 20 nm. The mean major axis length preferably ranges from 20 to 60 nm, more preferably from 20 to 50 nm, and further preferably from 20 to 45 nm. Examples of ferromagnetic powders are yttrium-containing Fe, Fe—Co, Fe—Ni, and Co—Ni—Fe. The yttrium content of the ferromagnetic powder, denoted as the ratio of yttrium atoms to iron atoms, Y/Fe, is preferably from 0.5 to 20 atomic percent, more preferably from 5 to 10 atomic percent. At equal to or greater than 0.5 atomic percent, ferromagnetic powder with a high saturation magnetization ($\sigma_s$) becomes possible, enhancing magnetic characteristics and resulting in good electromagnetic characteristics. At equal to or less than 20 atomic percent, the content of iron is adequate and magnetic characteristics are good, enhancing electromagnetic characteristics. At equal to or less than 20 atomic percent per 100 atomic percent of iron, it is possible to incorporate aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, and the like. The ferromagnetic metal powder may also contain small amounts of water, hydroxides, or oxides.

An example of a method of manufacturing ferromagnetic powder containing cobalt and yttrium suitable for use in the present invention will be given. An example of employing a starting material in the form of iron oxyhydroxide obtained by blowing an oxidizing gas into an aqueous suspension obtained by mixing ferrous salt with an alkali will be given. The preferred iron oxyhydroxide is α-FeOOH. In a first manufacturing method, ferrous salt is neutralized with an alkali hydroxide to obtain an aqueous suspension of $Fe(OH)_2$, and oxidizing gas is blown into this suspension to obtain acicular α-FeOOH. In a second manufacturing method, ferrous salt is neutralized with an alkali carbonate to obtain an aqueous suspension of $FeCO_3$ and oxidizing gas is blown into this suspension to obtain spindle-shaped α-FeOOH. This iron oxyhydroxide is desirably obtained by reacting a ferrous salt aqueous solution with an alkali aqueous solution to obtain an aqueous solution containing ferrous hydroxide, which is then oxidized in air. In this process, Ni salt; the salt of an alkaline earth element such as Ca salt, Ba salt, or Sr salt; Cr salt; Zn salt, or the like may also be present in the ferrous salt aqueous solution. The suitable selection and use of such a salt makes it possible to obtain a granular shape (axial ratio).

Desirable ferrous salts are ferrous chloride and ferrous sulfate. Examples of desirable alkalis are sodium hydroxide, ammonia water, ammonium carbonate, and sodium carbonate. Examples of desirable salts for combination are chlorides such as nickel chloride, calcium chloride, barium chloride, strontium chloride, chromium chloride, and zinc chloride. When incorporating cobalt into the iron, prior to incorporating the yttrium, an aqueous solution of a cobalt compound such as cobalt sulfate or cobalt chloride is admixed to the slurry of iron oxyhydroxide. After preparing a slurry of cobalt-containing iron oxyhydroxide, an aqueous solution of an yttrium compound can be added to the slurry and mixed in by stirring to incorporate the yttrium.

In addition to yttrium, it is possible to incorporate neodymium, samarium, praseodymium, lanthanum, and the like into the ferromagnetic powder of the present invention. These can be incorporated using chlorides such as yttrium chloride, neodymium chloride, samarium chloride, praseodymium chloride, and lanthanum chloride, or nitrates such as neodymium nitrate, gadolinium nitrate, or the like. Two or more of these may be employed in combination. The shape of the ferromagnetic powder is not specifically limited. However, acicular, granular, cubic, rice grain-shaped, or plate-shaped ferromagnetic powder is normally employed. The use of acicular ferromagnetic powder is particularly desirable.

A magnetic coating material is obtained by kneading and dispersing the above resin component, curing agent, and ferromagnetic powder with one of the solvents commonly employed to prepare magnetic coating liquids, such as methyl ethyl ketone, dioxane, cyclohexanone, or ethyl acetate. Kneading and dispersion may be conducted by the usual methods. In addition to the above-described components, it is possible to incorporate commonly employed additives and fillers into the magnetic coating liquid, such as abrasives such as $α-Al_2O_3$ and $Cr_2O_3$; antistatic agents such as carbon black; lubricants such as fatty acids, fatty esters and silicone oils; and dispersing agents.

(Hexagonal Ferrite Ferromagnetic Powder)

A hexagonal ferrite powder can be used as a ferromagnetic powder employed in the magnetic layer in the present invention. Various substitution products of barium ferrite, strontium ferrite, lead ferrite, calcium ferrite, and Co substitution products or the like can be employed as the hexagonal ferrite. Specific examples are magnetoplumbite-type barium ferrite and strontium ferrite, magnetoplumbite-type ferrite, the particle surface of which is covered with spinels, and magnetoplumbite-type barium ferrite and strontium ferrite partly containing a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co and Nb—Zn have been added may generally also be employed. Specific impurities are also sometimes incorporated based on the starting materials and manufacturing method.

The mean plate diameter of hexagonal ferrite powder that is suitable for use in the present invention varies with the recording density, but is normally from 10 to 60 nm, preferably from 10 to 40 nm, and more preferably from 10 to 35 nm. Here, the term "plate diameter" refers to the maximum diameter of the hexagonal bottom surface of a hexagonal pole of hexagonal ferrite magnetic powder, and the term "mean plate diameter" means the arithmetic average thereof. In particular, when reproduction is conducted with a magnetoresistive head to improve track density, low noise is necessary and the plate diameter is desirably equal to or less than 35 nm. However, so long as the plate diameter is within a range of 10 to 60 nm, it is possible to achieve stable magnetization unaffected by thermal fluctuation, and noise can be suppressed, which is suitable for high-density magnetic recording. The plate ratio (plate diameter/plate thickness) is preferably from 1 to 15, more preferably from 1 to 7. A plate ratio of equal to or greater than 1 maintains a high fill rate in the magnetic layer while permitting adequate orientation. A plate ratio of equal to or less than 15 tends to prevent the effects of particle stacking without increasing noise.

The specific surface area by BET method within the above particle size range is usually 30 to 200 $m^2/g$, almost corresponding to an arithmetic value from the particle plate diameter and the plate thickness. Narrow distributions of particle plate diameter and plate thickness are normally preferred. To assign a number is difficult, but comparison is possible by randomly measuring 500 particles in a TEM photograph of particles. The distributions are often not a normal distribution. However, when expressed as the standard deviation to the average size, σ/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution are known.

The coercivity (Hc) measured in the hexagonal ferrite ferromagnetic powder can be made about 159 to 239 kA/m (2,000 to 3,000 Oe). Although a high coercivity (Hc) is advantageous to high-density recording, this is limited by the capacity of the recording head. The coercivity (Hc) can be controlled through the particle size (plate diameter, plate thickness), the type and quantity of elements contained, the substitution site of elements, and the conditions under which the particle generating reaction is conducted.

Saturation magnetization (σs) of the hexagonal ferrite ferromagnetic powder suitably ranges from 30 to 80 A·m²/kg, preferably from 50 to 80 A·m²/kg. The saturation magnetization (σs) tends to decrease the smaller the particles become. Manufacturing methods include methods of reducing the crystallization temperature or heat treatment temperature, and methods of increasing the compounds added and increasing the level of surface treatment. It is also possible to employ W-type hexagonal ferrite. In the course of dispersing the magnetic material, the surface of the particles of magnetic material may be treated with a substance suited to the dispersion medium or polymer.

Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added may range from 0.1 to 10 weight percent relative to the weight of the ferromagnetic powder. The pH of the ferromagnetic powder is also important to dispersion. A pH of about 4 to 12 is usually optimum for the dispersion medium and polymer. From the perspective of the chemical stability and storage properties of the medium, a pH of about 6 to 11 can be selected. Moisture contained in the ferromagnetic powder also affects dispersion. There is an optimum level for the dispersion medium and polymer, usually selected from the range of 0.01 to 2.0 percent.

Methods of manufacturing the hexagonal ferrite include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention.

<Thickness and Coercivity Hc of the Magnetic Layer>

In the present invention, the thickness of the magnetic layer is equal to or less than 0.15 μm. The thickness of the magnetic layer is preferably from 0.02 to 0.13 μm, more preferably from 0.02 to 0.1 μm.

A magnetic layer thickness of equal to or less than 0.15 μm is desirable in that it permits optimization of the PW50 (pulse half-width) and obtaining a stable error rate in high-density recording. It is also advantageous in terms of manufacturing cost.

In the present invention, the magnetic layer has a coercivity (Hc) ranging from 159 to 239 kA/m (2,000 to 3,000 Oe) in a longitudinal direction or an in-plane direction to reduce self-demagnetization loss and achieve high-density recording. A coercivity (Hc) of equal to or greater than 159 kA/m achieves good high-density recording. Although the higher the coercivity (Hc) the better for achieving a high S/N ratio in high-density recording, the erasure rate drops when coercivity is too high. Thus, in the present invention, the maximum value of Hc in a longitudinal direction or an in-plane direction of the magnetic layer is set to 239 kA/m. The level of coercivity (Hc) preferably falls within a range of 159 to 207 kA/m (2,200 to 2,600 Oe), more preferably within a range of 183 to 200 kA/m (2,300 to 2,500 Oe).

In the present specification, the "longitudinal direction of the magnetic layer" refers to a direction conforming to the running direction of a tape-like magnetic recording medium that is perpendicular to the width direction. In the present specification, the "in-plane direction of the magnetic layer" refers to the direction from the center to the periphery of the magnetic layer in a disk-shaped magnetic recording medium.

To achieve the above-stated coercivity (Hc) levels in a longitudinal direction or an in-plane direction of the magnetic layer in the present invention, fine ferromagnetic powder having a mean major axis length or mean plate diameter of equal to or less than 60 nm, a saturation magnetization (σs) of 110 to 155 Am²/kg, and a ferromagnetic power coercivity (Hc) of equal to or greater than 159 kA/m is suitably employed in the present invention.

Additives that can be incorporated into the magnetic layer along with the above-described binder and ferromagnetic powder in the present invention will be described below.

<Carbon Black>

Examples of carbon black suitable for use in the magnetic layer are furnace black for rubber, thermal for rubber, black for coloring, and acetylene black. It is suitable for carbon black to have a specific surface area of 5 to 500 m²/g, a DBP oil absorption capacity of 10 to 400 ml/100 g, a mean particle diameter of 5 to 300 nm, a pH of 2 to 10, a moisture content of 0.1 to 10 percent, and a tap density of 0.1 to 1 g/ml. Specific examples of carbon black are described in WO98/35345.

Carbon black works to prevent static, reduce the coefficient of friction, impart light-blocking properties, enhance film strength, and the like; the properties vary with the type of carbon black employed. Accordingly, when the magnetic recording medium of the present invention has a multilayer structure, the type, quantity, and combination of carbon blacks employed may be determined separately for the magnetic layer and the nonmagnetic layer based on the objective and the various characteristics stated above, such as particle size, oil absorption capacity, electrical conductivity, and pH, and be optimized for each layer.

<Abrasive>

In the present invention, abrasives can be added in the magnetic layer. Known materials, chiefly with a Mohs' hardness equal to or higher than 6, such as α-alumina having an α-conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives. Further, a composite comprising two or more of these abrasives (an abrasive obtained by surface-treating one abrasive with another) may also be used.

Although these abrasives may contain compounds and elements other than the main component or element in some cases, there is no change in effect so long as the main component constitutes equal to or higher than 90 percent. The mean particle diameter of these abrasives preferably ranges from 0.01 to 2 μm. In particular, in order to improve electromagnetic characteristics (S/N), narrow particle size distribution is preferred. In order to improve durability, abrasives of differing particle size may be combined as needed or the particle size distribution of a single abrasive may be broadened to achieve the same effect.

It is desirable that the tap density of the abrasive ranges from 0.3 to 2 g/mL, the water content ranges from 0.1 to 5 percent, the pH ranges from 2 to 11, and the specific surface area ranges from 1 to 30 m$^2$/g. The abrasive employed in the present invention may be any of acicular, spherical, or cubic in shape, but shapes that are partially angular have good abrasion properties and are thus preferred. Specific examples are the abrasives described in WO98/35345; of these, when a diamond abrasive is employed as described therein, running durability and electromagnetic characteristics may be effectively improved. The particle diameter and quantity of abrasive employed in the magnetic layer and nonmagnetic layer should be optimally set.

<Other Additives>

Examples of other additives that may be employed in the magnetic layer in the present invention are additives having lubricating, antistatic, dispersing, and plasticizing effects. These may be combined to improve overall properties. Lubricants having a marked effect on adhesion produced by friction between the surfaces of substances may be employed as lubricating additives. There are two types of lubricants. Although the lubricants employed in magnetic recording media cannot be categorized as being entirely fluid lubricants or boundary lubricants, they can be classified according to the general concept into fluid lubricants such as higher fatty esters, liquid paraffin, and silicone derivatives, and boundary lubricants such as long-chain fatty acids, fluorine-based surfactants, and fluorine-containing polymers. In particulate media, lubricants are present either dissolved in the binder or partially adsorbed on the surface of ferromagnetic powder. Lubricants migrate to the surface of the magnetic layer, and their migration rate is determined by the level of compatibility between the binder and the lubricant. When the level of compatibility between binder and lubricant is high, the migration rate is low, and when the level of compatibility is low, the migration rate is high. One way of considering the level of compatibility is to compare the dissolution parameters of the two. Nonpolar lubricants are effective in fluid lubrication, while polar lubricants are effect in boundary lubrication.

In the present invention, it is suitable that these fluid lubricants and boundary lubricants having different characteristics can be employed in combination. It is preferred that fluid lubricants in the form of higher fatty esters and boundary lubricants in the form of long-chain fatty acids are combined, more preferably into combinations of three or more. In addition, solid lubricants may also be employed therewith.

Examples of solid lubricants are molybdenum disulfide, tungsten graphite disulfide, boron nitride, and graphite fluoride. Examples of boundary lubricants in the form of long-chain fatty acids are monobasic fatty acids having from 10 to 24 carbon atoms (optionally containing unsaturated bonds or branches) and metal salts thereof (such as Li, Na, K, and Cu). Examples of fluorine-based surfactants and fluorine-containing polymers are fluorine-containing silicone, fluorine-containing alcohols, fluorine-containing esters, fluorine-containing alkyl sulfuric acid esters, and alkali metal salts thereof. Examples of fluid lubricants in the form of higher fatty esters are monofatty acid esters, difatty acid esters, and trifatty acid esters comprised of a monobasic fatty acid having from 10 to 24 carbon atoms (optionally containing unsaturated bonds or branches) and at least one from among monohydric, dihydric, trihydric, tetrahydric, pentahydric, and hexahydric alcohols having from 2 to 12 carbon atoms (optionally containing unsaturated bonds or branches); and fatty acid esters of monoalkyl ethers of alkylene oxide polymers. Examples of liquid paraffin and silicone derivatives are dialkylpolysiloxane (the alkyl comprising 1 to 5 carbon atoms), dialkoxypolysiloxane (the alkoxy comprising 1 to 4 carbon atoms), monoalkyl-monoalkoxypolysiloxane (the alkyl comprising 1 to 5 carbon atoms and the alkoxy comprising 1 to 4 carbon atoms), phenylpolysiloxane, fluoroalkylpolysiloxane (the alkyl comprising 1 to 5 carbon atoms), and other silicone oils, polar group-containing silicone, fatty acid-modified silicone, and fluorine-containing silicone.

Examples of other lubricants are: monohydric, dihydric, trihydric, tetrahydric, pentahydric, and hexahydric alcohols having from 12 to 22 carbon atoms (optionally containing unsaturated bonds or branches); alkoxy alcohols containing 12 to 22 carbon atoms (optionally containing unsaturated bonds or branches); fluorine-containing alcohols; other alcohols; polyethylene wax; polypropylene; other polyolefins; ethylene glycol; polyethyleneoxide wax; other polyglycols; alkyl phosphoric acid esters and alkali metal salts thereof; alkyl sulfuric acid esters and alkali metal salts thereof polyphenylether; fatty acid amides having 8 to 22 carbon atoms; and aliphatic amines having 8 to 22 carbon atoms.

Examples of compounds exhibiting antistatic, dispersive, and plasticizing effects that are suitable for use are phenyl phosphonates such as "PPA" made by Nissan Chemical Industries, Ltd., α-naphthyl phosphate, diphenyl phosphate, p-ethylbenzene phosphonate, phenyl phosphinate, aminoquinones, various silane coupling agents, titanium coupling agents, fluorine-containing alkyl sulfuric acid esters, and alkali metal salts thereof.

Examples of preferred lubricants for use in the present invention are fatty acids and fatty esters; more specifically, those described in WO98/35345. Other lubricants and additives may be additionally combined for use.

It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in *A Guide to Surfactants* (published by Sangyo Tosho K.K.). These lubricants, antistatic agents and the like need not be 100 percent pure and may contain impurities, such as isomers, unreacted material, by-products, decomposition products, and oxides in addition to the main components. These impurities are preferably comprised equal to or less than 30 percent, and more preferably equal to or less than 10 percent.

In the present invention, it is also preferred that fatty esters comprising monoesters and diesters are employed as described in WO98/35345.

In the present invention, the content of lubricants in the magnetic layer preferably ranges from 5 to 30 weight parts per 100 weight parts of ferromagnetic powder.

The lubricants and surfactants suitable for use in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 weight percent, preferably from 2 to 25 weight percent per 100 weight parts of the ferromagnetic powder or the nonmagnetic powder is preferred.

All or some of the additives suitable for use in the present invention may be added at any stage in the process of manufacturing the magnetic and nonmagnetic coating liquids. For example, they may be mixed with the ferromagnetic powder before a kneading step; added during a step of kneading the ferromagnetic powder, the binder, and the solvent; added during a dispersing step; added after dispersing; or added immediately before coating. Depending on the objective, part or all of the additives may be applied by simultaneous or sequential coating after the magnetic layer has been applied to achieve a specific purpose. Depending on the objective, the lubricant may be coated on the surface of the magnetic layer after calendering or making slits.

Nonmagnetic Layer

The magnetic recording medium of the present invention may have a nonmagnetic layer as a lower layer to the above magnetic layer. Details of the nonmagnetic layer will be described below.

In the present invention, the nonmagnetic layer has the effect of a nonmagnetic layer if it is essentially nonmagnetic. For example, even when containing trace amounts of magnetic powders intentionally or as impurities, the nonmagnetic layer can be considered as having essentially the same structure as the present invention so long as it exhibits the effect of the present invention.

Here, the term "essentially nonmagnetic layer" indicates that the nonmagnetic layer has a residual magnetic flux density of equal to or less than 10 T·m or a coercivity (Hc) of equal to or less than 8 kA/m (100 Oe), preferably no residual magnetic flux density or coercivity. When magnetic powders are contained in the nonmagnetic layer, it desirably constitutes less than half of the total inorganic powder in the nonmagnetic layer. Instead of a nonmagnetic layer, a soft magnetic layer containing soft magnetic powder and binder may be formed as a lower layer. The thickness of the soft magnetic layer can be identical to that of the nonmagnetic layer.

The preferred nonmagnetic layers are those comprising an inorganic nonmagnetic powder and a binder as main components. The inorganic nonmagnetic powder employed in the nonmagnetic layer can be selected from inorganic compounds such as metal oxides, metal carbonates, metal sulfates, metal nitrides, metal carbides, metal sulfides and the like. Examples of inorganic compounds are α-alumina having an α-conversion rate equal to or higher than 90 percent, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and α-iron oxide.

The mean particle diameter of these inorganic nonmagnetic powders preferably ranges from 5 to 200 nm, but inorganic nonmagnetic powders of differing mean particle diameter may be combined as needed, or the particle diameter distribution of a single inorganic nonmagnetic powder may be broadened to achieve the same effect. What is preferred most is a mean particle diameter in the inorganic nonmagnetic powder ranging from 10 to 200 nm. Particularly when the inorganic nonmagnetic powder is a granular metal oxide, a mean particle diameter equal to or less than 80 nm is preferred, and when an acicular metal oxide, the mean major axis length is preferably equal to or less than 300 nm, more preferably equal to or less than 200 nm.

The tap density of the inorganic nonmagnetic powder preferably ranges from 0.05 to 2 g/ml, more preferably from 0.2 to 1.5 g/ml. The moisture content of the inorganic nonmagnetic powder preferably ranges from 0.1 to 5 weight percent, more preferably from 0.2 to 3 weight percent, further preferably from 0.3 to 1.5 weight percent. The pH of the inorganic nonmagnetic powder preferably ranges from 2 to 11, and the pH between 5.5 to 10 is particular preferred. The specific surface area of the inorganic nonmagnetic powder preferably ranges from 1 to 100 $m^2/g$, more preferably from 5 to 80 $m^2/g$, further preferably from 10 to 70 $m^2/g$. The crystallite size of the inorganic nonmagnetic powder preferably ranges from 0.004 to 1 $\mu m$, further preferably from 0.04 to 0.1 $\mu m$. The oil absorption capacity using dibutyl phthalate (DBP) preferably ranges from 5 to 100 ml/100 g, more preferably from 10 to 80 ml/g, further preferably from 20 to 60 ml/100 g. The specific gravity of the inorganic nonmagnetic powder preferably ranges from 1 to 12, more preferably from 3 to 6. The shape of the inorganic nonmagnetic powder may be any of acicular, spherical, polyhedral, or plate-shaped. The Mohs' hardness is preferably 4 to 10. The stearic acid (SA) adsorption capacity of the inorganic nonmagnetic powders preferably ranges from 1 to 20 $\mu mol/m^2$, more preferably from 2 to 15 $\mu mol/m^2$, further preferably from 3 to 8 $\mu mol/m^2$. The pH between 3 to 6 is preferred.

The surface of these inorganic nonmagnetic powders is preferably treated with $Al_2O_3$, $SiO_2$, $TiO_2$, $ZrO_2$, $SnO_2$, $Sb_2O_3$, ZnO and $Y_2O_3$. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

With respect to specific examples and manufacturing methods of the inorganic nonmagnetic powder employed in the lower layer in the present invention, WO98/35345 can be referred to.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

As regards binders, lubricants, dispersants, and additives; solvents; dispersion methods and the like of the nonmagnetic layer and a backcoat layer described below, those of magnetic layers can be applied. In particular, the techniques known with regard to magnetic layers may be applied to the quantity and types of binders, additives, and dispersants added.

[Nonmagnetic Support]

The support employed in the magnetic recording medium of the present invention is desirably a nonmagnetic flexible support. The thermal shrinkage rate in any in-plane direction of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. Further, the difference between the thermal shrinkage rate of the support after 30 min at 100° C. and the thermal shrinkage rate after 30 min at 80° C. is equal to or less than 10 percent for any in-plane direction of the support. The support is also desirably nonmagnetic.

Known films can be employed as a support; such as polyesters such as polyethylene terephthalate and polyethylene naphthalate, polyolefins, cellulose triacetate, polycarbonates, aromatic and aliphatic polyamides, polyimides, polyamidoimides, polysulfones, polyaramides, and polybenzooxazoles. Of these, the use of high-strength supports such as polyethylene naphthalate and polyamide is preferred. To change the surface roughness of the magnetic layer surface and the base surface of the support, a laminated support such as those described in Japanese Unexamined Patent Publication (KOKAI) Heisei No. 3-224127 may be employed as required. These nonmagnetic supports may be subjected beforehand to corona discharge treatment, plasma treatment, adhesion-enhancing treatment, heat treatment, dust removal, or the like. Aluminum and glass substrates may be employed as a support in the present invention.

The center surface average surface roughness SRa of the support as measured by HD-2000 made by WYKO is preferably equal to or less than 4.0 nm, more preferably equal to or less than 2.0 nm. Not only does such a support desirably have a low center surface average surface roughness, but there are also desirably no large protrusions equal to or higher than 0.5 μm. The surface roughness shape may be freely controlled through the size and quantity of filler added to the support as needed. Examples of such fillers are oxides and carbonates of elements such as Ca, Si, and Ti, and organic micropowders such as acrylic-based one. The support desirably has a maximum height $R_{max}$ equal to or less than 1 μm, a ten-point average roughness $R_z$ equal to or less than 0.5 μm, a center surface peak height $R_p$ equal to or less than 0.5 μm, a center surface valley depth $R_v$ equal to or less than 0.5 μm, a center-surface surface area percentage Sr of 10 percent to 90 percent, and an average wavelength $\gamma_a$ of 5 to 300 μm. To achieve desired electromagnetic characteristics and durability, the surface protrusion distribution of the support can be freely controlled with fillers. It is possible to control within a range from 0 to 2,000 protrusions of 0.01 to 1 μm in size per 0.1 mm².

The F-5 value of the support employed in the present invention desirably ranges from 49 to 490 MPa (5 to 50 kg/mm²). The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the support preferably ranges from 49 to 980 MPa (5 to 100 kg/mm²). The modulus of elasticity preferably ranges from 980 to 19600 MPa (100 to 2,000 kg/mm²). The thermal expansion coefficient of the support preferably ranges from $10^{-4}$ to $10^{-8}$/° C., more preferably from $10^{-5}$ to $10^{-6}$/° C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions.

[Backcoat Layer]

A backcoat layer can be provided in the magnetic recording medium of the present invention as needed on the opposite surface of the nonmagnetic support from the surface upon which the magnetic layer is present. A backcoat layer may also be provided on a magnetic disk. Stronger repeat running properties are generally required of magnetic tapes for recording computer data than for audio and video tapes. To maintain such high running durability, carbon black and inorganic powder are desirably incorporated into the backcoat layer.

Carbon blacks having two different mean particle diameters are desirably combined for use in the backcoat layer. In that case, microgranular carbon black having a mean particle diameter of 10 to 20 nm and coarse-granular carbon black having a mean particle diameter of 230 to 300 nm are desirably employed in combination. Generally, such microgranular carbon black can be added to set low surface resistivity and low light transmittance. In magnetic recording devices, the light transmittance of the tape is often used for operating signals. In such cases, the addition of microgranular carbon black is particularly effective. Microgranular carbon black generally has good liquid lubricant retentivity, and when employed in combination with a lubricant, contributes to reducing the coefficient of friction. Coarse-granular carbon black with a mean particle diameter of 230 to 300 nm functions as a solid lubricant, forming minute protrusions on the surface of the backcoat layer, reducing the contact surface area, and contributing to reducing the coefficient of friction.

Specific examples of commercial microgranular carbon black and coarse-granular carbon black that can be employed in the backcoat layer in the present invention are described in WO98/35345.

When employing carbon blacks of two different mean particle diameters in the backcoat layer, the ratio (by weight) of 10 to 20 nm microgranular carbon black to 230 to 300 nm coarse-granular carbon black preferably falls within a range of 98:2 to 75:25, more preferably within a range of 95:5 to 85:15.

The content of carbon black (the total content when employing two types) in the backcoat layer normally falls within a range of 30 to 80 weight parts, preferably a range of 45 to 65 weight parts, per 100 weight parts of binder.

Two inorganic powders of differing hardness are desirably employed in combination in the backcoat layer. Specifically, a soft inorganic powder having a Mohs' hardness of 3 to 4.5 and a hard inorganic powder having a Mohs' hardness of 5 to 9 are desirably employed. The addition of a soft inorganic powder having a Mohs' hardness of 3 to 4.5 helps stabilize the coefficient of friction during repeated running. Within this hardness range, there is no shaving of the slide guidepoles. The mean particle diameter of this inorganic powder desirably falls within a range of 30 to 50 nm.

Examples of soft inorganic powders having a Mohs' hardness of 3 to 4.5 are calcium sulfate, calcium carbonate, calcium silicate, barium sulfate, magnesium carbonate, zinc carbonate, and zinc oxide. These may be employed singly or in combinations of two or more.

The content of soft inorganic powder in the backcoat layer preferably falls within a range of 10 to 140 weight parts, more preferably 35 to 100 weight parts, per 100 weight parts of carbon black.

The addition of hard inorganic powder having a Mohs' hardness of 5 to 9 increases the strength of the backing layer and improves running durability. When these inorganic powders are employed with carbon black and the above-described soft inorganic powder, there is little deterioration with repeat sliding and the backcoat layer becomes strong. The addition of these inorganic powders contributes to a suitable abrasive strength and reduced adhesion of shavings to the tape guidepoles. In particular, when employed in combination with soft magnetic powder, the sliding characteristics for guidepoles having coarse surfaces are improved and the coefficient of friction of the backcoat layer can be stabilized.

The mean particle diameter of the hard inorganic powder preferably falls within a range of 80 to 250 nm, more preferably within a range of 100 to 210 nm.

Examples of hard inorganic powder having a Mohs' hardness of 5 to 9 are: $\alpha$-iron oxide, $\alpha$-alumina, and chromium oxide ($Cr_2O_3$). These powders may be employed singly or in combination. Of these, $\alpha$-iron oxide and $\alpha$-alumina are preferred. The content of hard inorganic powder is normally from 3 to 30 weight parts, preferably from 3 to 20 weight parts, per 100 weight parts of carbon black.

When the above soft inorganic powder and hard inorganic powder are employed in combination in the backcoat layer, the soft inorganic powder and hard inorganic powder are desirably selected for use so that the difference in hardness between the soft inorganic powder and hard inorganic powder is equal to or greater than 2 (preferably equal to or greater than 2.5, and more preferably, equal to or greater than 3).

Two types of inorganic powder having different Mohs' hardness and having the above-specified mean particle diameters and two types of carbon black having the above-stated mean particle diameters are desirably incorporated into the backcoat layer.

Lubricants can be incorporated into the backcoat layer. These lubricants may be suitably selected for use from among the lubricants given as examples for use in the above description of the nonmagnetic layer and magnetic layer. Lubricants are usually added in a range of 1 to 5 weight parts per 100 weight parts of binder.

[Undercoating Layer]

An undercoating layer may be provided between the nonmagnetic support and magnetic layer or nonmagnetic layer as needed in the magnetic recording medium of the present invention. Providing an undercoating layer enhances the adhesive strength of the magnetic layer or nonmagnetic layer to the nonmagnetic support. Polyester resins soluble in solvents can be employed as an undercoating layer.

The magnetic recording medium of the present invention can be employed in magnetic recording and reproduction systems in which a signal magnetically recorded on a magnetic recording medium is reproduced by a magnetoresistive head (MR head). The MR head employed for reproduction is not specifically limited; examples are GMR heads and TMR heads. The saturation magnetization level of the head employed in magnetic recording is not specifically limited, but a saturation magnetization level ranging from 1.0 T to 1.5 T is preferred.

[Layer Structure]

In the magnetic recording medium of the present invention, the thickness of the nonmagnetic support normally ranges from 2 to 100 $\mu$m, preferably from 2 to 80 $\mu$m. In the case of computer tapes, the nonmagnetic support having a thickness of 3.0 to 6.5 $\mu$m (preferably 3.0 to 6.0 $\mu$m, more preferably 4.0 to 5.5 $\mu$m) can be employed.

The thickness of the undercoating layer can range from 0.1 to 1.0 $\mu$m, preferably from 0.1 to 0.7 $\mu$m. When a backcoat layer is provided, the thickness of the backcoat layer can range from 0.2 to 1.0 $\mu$m, preferably from 0.3 to 0.7 $\mu$m.

In the magnetic recording medium of the present invention, the thickness of the nonmagnetic layer and magnetic layer can be optimized based on the saturation magnetization level of the head employed, the head gap length, and the band of the recording signal. In the present invention, as set forth above, the thickness of the magnetic layer is set to equal to or less than 0.15 $\mu$m, preferably within a range of 0.02 to 0.13 $\mu$m, and more preferably within a range of 0.02 to 0.1 $\mu$m. The thickness of the nonmagnetic layer is normally from 0.5 to 4.0 $\mu$m, preferably from 1.0 to 3.0 $\mu$m, and more preferably from 1.0 to 2.0 $\mu$m.

In a magnetic recording medium having two magnetic layers, the nonmagnetic layer and soft magnetic layer may be provided or omitted. For example, the thickness of the magnetic layer on the far side of the support can be made 0.01 to 0.1 $\mu$m, preferably 0.01 to 0.05 $\mu$m, and the thickness of the magnetic layer on the near side of the support can be made 0.05 to 0.15 $\mu$m. When there is only one magnetic layer, the thickness of the magnetic layer is equal to or less than 0.15 $\mu$m, as stated above.

[Manufacturing Method]

The process for manufacturing the magnetic coating liquid of the magnetic recording medium of the present invention comprises at least a kneading step, a dispersing step, and a mixing step to be carried out, if necessary, before and/or after the kneading and dispersing steps. Each of the individual steps may be divided into two or more stages. All of the starting materials employed in the magnetic recording medium of the present invention, including the magnetic powder, nonmagnetic powder, radiation-curing resin, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion.

To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the magnetic powder or nonmagnetic powder and all or part of the binder (preferably equal to or higher than 30 percent of the entire quantity of binder) are kneaded in a range of 15 to 500 weight parts per 100 weight parts of the magnetic powder. Details of the kneading process are described in Japanese Unexamined Patent Publication (KOKAI) Heisei Nos. 1-106338 and 1-79274. Further, glass beads may be employed to disperse the coating liquid for magnetic layer and the coating liquid for nonmagnetic layer, with a dispersing medium with a high specific gravity such as zirconia beads, titania beads, and steel beads being suitable for use. The particle diameter and fill ratio of these dispersing media are optimized for use. A known dispersing device may be employed.

A nonmagnetic layer coating liquid and a magnetic layer coating liquid may be sequentially or simultaneously multilayer-coated. When there are two magnetic layers, the lower magnetic layer coating liquid and upper magnetic layer coating liquid may be sequentially or simultaneously multilayer-coated. The nonmagnetic layer and magnetic layer are desirably applied as follows; the nonmagnetic layer coating liquid containing a nonmagnetic powder and a binder is coated on the nonmagnetic support and dried to form the nonmagnetic layer, after which the magnetic coating liquid containing a ferromagnetic powder and a binder is coated over the nonmagnetic layer and dried to form the magnetic layer. That is, the magnetic layer is preferably formed by a wet-on-dry method.

Coating machines suitable for use in coating the magnetic and nonmagnetic coating liquids mentioned above are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters and the like. For example, "Recent Coating Techniques" (May 31, 1983), issued by the Sogo Gijutsu Center (K.K.) may be referred to in this regard.

Methods such as the following are desirably employed when coating a multilayer-structured magnetic recording medium in the present invention;

(1) A method in which the lower layer is first applied with a coating device commonly employed to apply magnetic coating materials such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the upper and lower layers are applied nearly simultaneously using an extrusion coating apparatus with a backup roller as disclosed in Japanese Unexamined Patent Publication (KOKAI) Heisei No. 2-174965.

To avoid deteriorating the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471.

In disk-shaped magnetic recording media, it is sometimes possible to achieve adequately isotropic orientation without conducting orientation with an orienting device. However, the use of a known random orientation device in which cobalt magnets are reciprocally positioned at an angle and an alternating current is applied with a solenoid is preferred. In the hexagonal ferrite, it is generally easy to achieve in-plane and vertical three-dimensional randomness, but in-plane two-dimensional randomness is also possible. Further, known methods such as magnets with facing opposite poles may be employed, and vertical orientation may be used to impart isotropic magnetic characteristics in a circular direction. In particular, in the case of high-density recording, vertical orientation is preferred. Further, a circular orientation may be imparted by spin coating.

In tape-shaped magnetic recording media, cobalt magnets and solenoids are employed to impart orientation in the longitudinal direction. The temperature and flow volume of the drying air, and coating rate are desirably controlled to control the drying position of the coating. The coating rate preferably ranges from 20 to 1,000 m/min, and the temperature of the drying air is preferably equal to or higher than 60° C. It is also possible to conduct suitable predrying prior to entering the magnet zone.

Processing may be conducted with calender rolls in the form of heat-resistant plastic rolls such as epoxy, polyimide, polyamide, and polyimidoamide, or metal rolls. When forming two-surface magnetic layers, treatment with metal rolls is particularly desirable. The processing temperature is preferably equal to or higher than 50° C., more preferably equal to or higher than 100° C. The linear pressure is preferably equal to or higher than 196 kN/m (200 kg/cm), more preferably equal to or higher than 294 kN/m (300 kg/cm).

[Physical Characteristics]

In the case of two-dimensional randomness in a disk-shaped magnetic recording medium, squareness is usually from 0.55 to 0.67, preferably from 0.58 to 0.64. In the case of three-dimensional randomness, squareness is desirably from 0.45 to 0.55. For vertical orientation, squareness is normally equal to or greater than 0.6, preferably equal to or greater than 0.7 in the vertical directions. When demagnetizing field correction is conducted, squareness is usually equal to or greater than 0.7, preferably equal to or greater than 0.8. The orientation ratio for two-dimensional randomness and three-dimensional randomness is desirably equal to or greater than 0.8. In the case of two-dimensional randomness, squareness in the vertical directions, the Br in the vertical directions and the Hc in the vertical directions are preferably within 0.1 to 0.5 times their values in the in-plane direction. In the case of a tape-shaped magnetic recording medium, squareness is preferably equal to or greater than 0.7, more preferably equal to or greater than 0.8.

The coefficient of friction of the magnetic recording medium of the present invention relative to the head is normally equal to or less than 0.5 and preferably equal to or less than 0.3 at temperatures ranging from −10° C. to 40° C. and humidity ranging from 0 percent to 95 percent, the specific surface resistivity preferably ranges from $10^4$ to $10^{12}$ Ω/sq on the magnetic surface, and the charge potential preferably ranges from −500 V to +500 V. The modulus of elasticity at 0.5 percent extension of the magnetic layer preferably ranges from 980 to 19600 MPa (100 to 2,000 kg/mm$^2$) in each in-plane direction. The breaking strength preferably ranges from 98 to 686 MPa (10 to 70 kg/mm$^2$). The modulus of elasticity of the magnetic recording medium preferably ranges from 980 to 14700 MPa (100 to 1,500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz) of the magnetic layer is preferably 70 to 150° C., and when the binder employed in the nonmagnetic layer comprises the polyurethane resin employed in the present invention, that of the nonmagnetic layer preferably ranges from 70 to 150° C., and when the binder employed in the nonmagnetic layer does not comprise such polyurethane resin, that of the nonmagnetic layer preferably ranges from 50 to 100° C. The loss elastic modulus preferably falls within a range of $1 \times 10^5$ to $8 \times 10^8$ Pa and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium. The residual solvent in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

It is preferred that the center surface average surface roughness Ra and the ten-point average roughness $R_z$ of the magnetic layer are respectively within a range of 5 to 50 nm. It is also preferred that the maximum height of the magnetic layer, $R_{max}$, is equal to or less than 0.5 μm; the center surface peak height $R_p$ is equal to or less than 0.3 μm; the center surface valley depth $R_v$ is equal to or less than 0.3 μm; the center surface area percentage $S_r$ ranges from 20 to 80 percent; and the average wavelength λ a ranges from 5 to 300 μm. The number of surface protrusions in the magnetic layer measuring 10 to 20 nm in size is preferably set to within a range of 5 to 1,000. These can be easily controlled by varying surface properties with fillers in the support, as well as by the particle diameter and quantity of powders added to the magnetic layer, the surface shape of the rollers employed in calendaring and the like. Curling is preferably within ±3 mm. It will be readily deduced that the physical properties of the nonmagnetic layer and magnetic layer may be varied based on the objective in the magnetic recording medium of the present invention. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

As we have continued to evolve into a multimedia society, the need to record images has grown stronger not just in the industrial world, but also in households. The magnetic recording medium of the present invention adequately meets the requirements of image recording media with respect to functions and costs, in addition to data such as simple text and numbers.

The magnetic recording medium of the present invention can be suitably employed in magnetic recording and pre-producing systems using magnetoresistive (MR) reproduction heads. The type of MR head is not specifically limited; both GMR and TMR heads may be employed. Although the head employed for recording is not specifically limited, a saturation magnetization level of equal to or greater than 1.2 T is desirable, with equal to or greater than 2.0 T being further preferred.

The magnetic recording medium of the present invention is suited to use in computer data recording.

Embodiments

The specific examples of the present invention will be described below. However, the present invention is not limited to the examples. Further, the "parts" given in the embodiments are weight parts unless specifically stated otherwise.

EXAMPLE OF POLYURETHANE SYNTHESIS

The diol components shown in Table 1 were dissolved in a 30 percent cyclohexanone solution at 60° C. under a nitrogen gas flow in a container that had been equipped with a reflux condenser and stirrer and replaced beforehand with nitrogen. Next, 60 ppm of dibutyltin dilaurate was added as a catalyst and dissolution conducted for another 15 minutes. The MDI shown in Table 1 was then added and a reaction was conducted with heating for 6 hours at 90° C., yielding a solution of polyurethane resin (A).

Polyurethane resins (B) to (D) were obtained by the same method as polyurethane resin A with the starting materials and composition ratios given in Table 1. The weight average molecular weight and Tg of the polyurethanes obtained are given in Table 1.

TABLE 1

| Polyurethane resin | Structure | Weight average molecular weight | Tg |
|---|---|---|---|
| A | DD/HBpA/DEIS/MDI = 15/85/100 (molar ratio) | 47500 | 160° C. |
| B | Polyester polyol(a)/DEIS/MDI = 100/2/100 (molar ratio) | 51000 | 100° C. |
| C | DD/HBpA/DEIS/MDI = 5/95/100 (molar ratio) | 46000 | 200° C. |
| D | Polyester polyol (b)/DEIS/MDI = 100/2/102 (molar ratio) | 42000 | 80° C. |

DD: Dimer diol
HBpA: Hydrogenated bisphenol A
DEIS: Sulfoisophthalic acid ethylene oxide adduct
MDI: Diphenylmethane diisocyanate
Polyester polyol (a): Isophthalic acid/neopentyl glycol = 1.5/1 (molar ratio)
Polyester polyol (b): Isophthalic acid/adipic acid/neopentyl glycol = 0.8/0.7/1 (molar ratio)

Embodiment 1

Composition of Magnetic Layer Coating Liquid

Ferromagnetic metal powder (A)     100 parts
Mean major axis length: 45 nm
Coercivity (Hc): 197 kA/m (2480 Oe)
Specific surface area by BET method: 68 m$^2$/g
Crystallite size: 13 nm (130 Å)
Surface treatment agent: $Al_2O_3$, $Y_2O_3$ -continued

| | |
|---|---|
| Particle size (mean major axis diameter): 0.06 μm | |
| Acicular ratio: 6 | |
| Saturation magnetization (σs): 120 A · m²/kg (120 emu/g) | |
| Polyurethane resin (A) | 12 parts |
| α-alumina (mean particle diameter: 0.1 μm) | 5 parts |
| HIT 60 (manufactured by Sumitomo Chemical Co., Ltd.) | |
| Carbon black (mean particle diameter: 0.08 μm) | 0.5 part |
| Butyl stearate | 1 part |
| Stearic acid | 5 parts |
| Methyl ethyl ketone | 90 parts |
| Cyclohexanone | 30 parts |
| Toluene | 60 parts |

Composition of Nonmagnetic Layer Coating Liquid

| | |
|---|---|
| Nonmagnetic powder α Fe₂O₃ hematite | 80 parts |
| Mean major axis length: 0.15 μm | |
| Specific surface area by BET method: 52 m²/g | |
| pH: 8 | |
| Tap density: 0.8 g/mL | |
| DBP oil absorption capacity: 80 ml/100 g | |
| Surface treatment agent: Al₂O₃, Y₂O₃ | |
| Carbon black | 20 parts |
| Mean primary particle diameter: 16 nm (16 mμ) | |
| DBP oil absorption capacity: 80 ml/100 g | |
| pH: 8 | |
| Specific surface area by BET method: 250 m²/g | |
| Volatile content: 1.5 percent | |
| Vinyl chloride copolymer | 12 parts |
| MR-104 manufactured by Nippon Zeon Co., Ltd. | |
| Polyurethane resin (A) | 5 parts |
| α-alumina (mean particle diameter: 0.1 μm) | 1 part |
| HIT 60 (manufactured by Sumitomo Chemical Co., Ltd.) | |
| Butyl stearate | 1 part |
| Stearic acid | 1 part |
| Methyl ethyl ketone | 100 parts |
| Cyclohexanone | 50 parts |
| Toluene | 50 parts |

Manufacturing of a Tape-Shaped Magnetic Recording Medium

Each of the components of the above magnetic layer coating liquid and nonmagnetic layer coating liquid was kneaded in an open kneader and then dispersed using a sand mill. To each of the dispersions of magnetic layer coating liquid and nonmagnetic layer coating liquid obtained were added 40 parts of a mixed solvent of methyl ethyl ketone and cyclohexanone, and the mixtures were filtered through filters having mean pore diameters of 1 μm to prepare a magnetic layer coating liquid and nonmagnetic layer coating liquid.

Simultaneous multilayer coating was conducted on a polyethylene terephthalate support 5 μm in thickness having a centerline surface roughness on the magnetic layer coating surface of 0.002 μm by applying the nonmagnetic layer coating liquid in a quantity calculated to yield a thickness upon drying of 6.8 to 7.2 μm and immediately thereafter applying the magnetic layer coating liquid in a quantity calculated to yield a thickness upon drying of 0.04 to 0.16 μm over the nonmagnetic layer. While the two layers were still wet, orientation was conducted with a cobalt magnet having a magnetic power of 300 T·m (3,000 G) and a solenoid having a magnetic force of 150 T·m (1,500 G). After drying, a seven-stage calender comprised of metal and epoxy resin rolls was employed to conduct surface treatment at a rate of 200 m/min and at a temperature of 40° C. Subsequently, a backcoat layer 0.5 μm in thickness was applied. The product was then slit to a width of 12.65 mm to prepare a magnetic computer tape.

(Embodiment 2)

With the exception that polyurethane resin (A) employed in Embodiment 1 was changed to polyurethane resin (B) shown in Table 1, a magnetic computer tape was manufactured by the same method as in Embodiment 1.

(Embodiment 3)

With the exception that polyurethane resin (A) employed in Embodiment 1 was changed to polyurethane resin (C) shown in Table 1, a magnetic computer tape was manufactured by the same method as in Embodiment 1.

(Embodiment 4)

With the exception that ferromagnetic metal powder (A) in Embodiment 1 was changed to ferromagnetic powder (B) (mean major axis length: 60 nm; coercivity Hc: 197.4 kA/m; specific surface area by BET method: 60 m²/g; crystallite size: 15 nm; saturation magnetization σs: 120 A·m²/kg), a magnetic computer tape was manufactured by the same method as in Embodiment 1.

(Embodiment 5)

With the exception that the thickness of the magnetic layer in Embodiment 1 was changed from 0.1 μm to 0.04 μm, a magnetic computer tape was manufactured by the same method as in Embodiment 1.

Comparative Example 1

With the exception that polyurethane resin (A) employed in Embodiment 1 was changed to polyurethane resin (D) shown in Table 1, a magnetic computer tape was manufactured by the same method as in Embodiment 1.

Comparative Example 2

With the exception that ferromagnetic metal powder (A) in Embodiment 1 was changed to ferromagnetic powder (C) (mean major axis length: 100 nm; coercivity Hc: 155.2 kA/m; specific surface area by BET method: 45 m²/g; crystallite size: 25 nm; saturation magnetization σs: 120 A·m²/kg), a magnetic computer tape was manufactured by the same method as in Embodiment 1.

Comparative Example 3

With the exception that ferromagnetic metal powder (A) in Embodiment 1 was changed to ferromagnetic powder (D) (mean major axis length: 100 nm; coercivity Hc: 191 kA/m; specific surface area by BET method: 45 m²/g; crystallite size: 25 nm; saturation magnetization σs: 120 A·m²/kg), a magnetic computer tape was manufactured by the same method as in Embodiment 1.

Comparative Example 4

With the exception that the thickness of the magnetic layer in Embodiment 1 was changed from 0.1 μm to 0.16 μm, a magnetic computer tape was manufactured by the same method as in Embodiment 1.

Evaluation Methods (1) Measurement of Magnetic Layer Thickness

A tape-shaped magnetic recording medium was cut with a diamond cutter to a thickness of about 0.1 μm in the longitudinal direction, observed with a transmission electron microscope at a magnification of 30,000×, and photographed. The print size of the photographs was paper size A4. Paying attention to differences in the shape of the ferromagnetic powder and nonmagnetic powder in the magnetic layer and nonmagnetic layer, lines were drawn at the boundary between the magnetic layer surface and the magnetic layer/nonmagnetic layer interface. Measurement was conducted with a JBAS2 Image Processor made by Zeiss. The results are given in Table 2.

(2) Tg of the Polyurethane Resin

Using a Rheovibron dynamic viscoelasticity measuring device made by A&D Co., Ltd, measurement was conducted at a frequency of 110 Hz and a temperature increase rate of 2° C./min. The peak temperature was obtained from the elasticity loss rate.

(3) Weight Average Molecular Weight of the Polyurethane

Using a Tosoh high-speed GPC HLC8020, measurement was conducted with THF solvent at a flow rate of 1 cc/min with an RI detector, and the value calculated by standard polyester conversion.

(4) Measurement of Coercivity (Hc)

Using a vibrating sample magnetometer (made by Toei Kogyo), coercivity was measured at Hm 796 kA/m (10 kOe). The results are given in Table 2.

(5) Measurement of Ferromagnetic Powder Particle Diameter

The method of photographing ferromagnetic powder by transmission electron microscopy and directly reading the minor axis diameter and major axis diameter of the ferromagnetic powder from the photographs was suitably combined with the method of tracing and reading transmission electron microscope photographs with an IBASS1 image analyzer made by Karl Zeiss Co. to obtain the mean particle diameter of the ferromagnetic power. The results are given in Table 2.

(6) Centerline Average Surface Roughness

The Ra of an area about 250 nm×250 nm on the medium surface was measured by the Mirau method with a TOPO3D made by WYKO. Spherical surface correction and cylindrical correction were made at a measurement wavelength of about 650 nm.

(7) The Increase in Coefficient of Friction During Repeated Running

In a 50° C., 20 percent RH environment, the surface of the magnetic layer was brought into contact with a guidepole used in a DDS4 drive and a load of 20 g (T1) was applied. Tension (T2) was applied to achieve 8 mm/s, and measurement was repeated through 100 passes to measure the coefficient of friction of the magnetic surface relative to the guidepole from a tension of T2/T1. The coefficient of friction of first pass was assigned a value of 1, and the coefficient of friction of 100 passes was calculated. The results are given in Table 2.

(8) Coating Damage

Following the measurement (7) of the coefficient of friction during repeated running, the surface of the magnetic layer of the sample was observed by differential interference microscopy and evaluated according to the following scale. The results are given in Table 2.

Excellent: No defects present.

Good: Some defects present, but portions without defects outnumbered portions with defects.

Poor: Portions with defects outnumbered portions without defects.

(9) PW50 Measurement Method

An original running system was assembled in which a tape was run between two reels. A tape guide was positioned between the reels and precise running was conducted without servo writing. The recording head employed had a track width of 25 μm and a gap width of 0.3 μm. The reproduction head employed was an SAL-type margin head having an MR sensor with modified shield spacing and a track width of 12 μm. The optimum recording current was set for a linear recording density of 150 kFCI, 100 kHz rectangular waves were recorded and reproduced, and the PW50 of a solitary wave (half-width of solitary wave) was measured. This was done at a running speed of 2.55 m/s. The results are given in Table 2.

(10) S/N Ratio of the Tape-shaped Magnetic Recording Medium

A recording head (MIG, 0.15 μm gap, 1.8 T) and a reproduction MR head (optimal Br·t: 0.035 T·μm) were mounted on a modified DLT7000 drive. These heads were secured. The S/N ratio was calculated from the reproduction output at a linear recording density of 100 kFCI and the noise (the signal component of a frequency 1 MHz far from the carrier frequency). The reproduction output and S/N ratio were evaluated relative to those of the magnetic tape of Comparative Example 2. The results are given in Table 2.

TABLE 2

|  | Type of urethane resin | Tg of urethane resin | Type of ferromagnetic metal powder | Coercivity (Hc) of magnetic layer in longitudinal direction | Mean major axis length of ferromagnetic powder | Magnetic layer thickness (μm) | S/N (dB) | PW50 (nm) | Coating damage | Ra of magnetic layer (nm) |
|---|---|---|---|---|---|---|---|---|---|---|
| Embodiment 1 | A | 160° C. | A | 191 kA/m(2400Oe) | 45 | 0.1 | 6.0 | 190 | Excellent | 2.8 |
| Embodiment 2 | B | 100° C. | A | 191 kA/m(2400Oe) | 45 | 0.1 | 6.8 | 190 | Good | 2.3 |
| Embodiment 3 | C | 200° C. | A | 191 kA/m(2400Oe) | 45 | 0.1 | 4.7 | 190 | Excellent | 3.5 |
| Embodiment 4 | A | 160° C. | B | 191 kA/m(2400Oe) | 60 | 0.1 | 4.2 | 190 | Excellent | 2.7 |
| Embodiment 5 | A | 160° C. | A | 191 kA/m(2400Oe) | 45 | 0.04 | 8.2 | 110 | Excellent | 1.9 |
| Comp. Ex. 1 | D | 80° C. | A | 191 kA/m(2400Oe) | 45 | 0.1 | 7.1 | 190 | Poor | 2.1 |
| Comp. Ex. 2 | A | 160° C. | C | 155 kA/m(1950Oe) | 100 | 0.1 | 0.0 | 290 | Excellent | 3.8 |
| Comp. Ex. 3 | A | 160° C. | D | 191 kA/m(2400Oe) | 100 | 0.1 | 2.1 | 260 | Excellent | 4.2 |
| Comp. Ex. 4 | A | 160° C. | A | 191 kA/m(2400Oe) | 45 | 0.16 | 6.2 | 290 | Excellent | 2.6 |

Table 2 reveals that magnetic recording media in which the Tg of the polyurethane resin employed in the magnetic layer was equal to or greater than 100° C., the mean major axis length of the ferromagnetic metal powder was equal to or less than 60 nm, and the thickness of the magnetic layer was equal to or less than 0.15 μm exhibited good S/N ratios and PW50 levels, and either no (Embodiments 1, 3 to 5) or little (Embodiment 2) coating damage.

By contrast, there was extensive scratching of the surface of the magnetic layer and considerable coating damage when the Tg of the polyurethane resin was less than 100° C. (Comparative Example 1). When the mean major axis length of the ferromagnetic metal powder was greater than 0.06 μm, the S/N ratio decreased and the PW50 increased. When the coercivity in the longitudinal direction of the magnetic layer was less than 159 kA/m (2,000 Oe), the S/N ratio decreased and the PW50 level increased. When the thickness of the magnetic layer was greater than 0.15 μm, the PW50 level increased.

It was thus found that an increase in the Tg of the binder (polyurethane resin) employed in the magnetic layer yielded durability that was more stable than in prior art magnetic recording media. Further, reducing the mean major axis length (mean plate diameter) of the ferromagnetic powder, reducing the thickness of the magnetic layer, and increasing the coercivity of the magnetic layer yielded a good S/N ratio and a low PW50 level, stabilizing the error rate.

In the magnetic recording medium of the present invention as set forth above, polyurethane resin having a Tg of 100 to 200° C. and ferromagnetic powder having a mean major axis length or a mean plate diameter of equal to or less than 60 nm are employed in at least the magnetic layer, the thickness of the magnetic layer is kept to equal to or less than 0.15 μm, and the coercivity of the magnetic layer is set to from 159 to 239 kA/m (2,000 to 3,000 Oe). Thus, the present invention provides a magnetic recording medium affording both good running durability and good electromagnetic characteristics.

The present disclosure relates to the subject matter contained in Japanese Patent Application No. 2003-111606 filed on Apr. 16, 2003, which is expressly incorporated herein by reference in its entirety.

What is claimed is:

1. A magnetic recording medium comprising a nonmagnetic layer comprising a nonmagnetic powder and a binder and a magnetic layer comprising a ferromagnetic powder and a binder in this order on a nonmagnetic support, wherein
at least the binder in said magnetic layer consists of polyurethane resin having a glass transition temperature ranging from 100 to 200° C.,
said magnetic layer has a thickness equal to or less than 0.15 μm,
said ferromagnetic powder has a mean major axis length or a mean plate diameter equal to or less than 60 nm, and
said magnetic layer has a coercivity (Hc) ranging from 159 to 239 kA/m in a longitudinal direction or an in-plane direction.

2. The magnetic recording medium according to claim 1, wherein said polyurethane resin is obtained by using a diol compound represented by the following general formula:

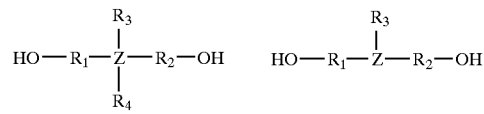

where Z is a ring structure selected from the group consisting of a cyclohexane ring, a benzene ring, and a naphthalene ring, $R_1$ and $R_2$ are respectively an alkylene group having 1 to 18 carbon atoms, and $R_3$ and $R_4$ are respectively an alkyl group having 2 to 18 carbon atoms.

3. The magnetic recording medium according to claim 1, wherein said polyurethane resin has a urethane group concentration ranging from 2.5 to 6.0 mmol/g.

4. The magnetic recording medium according to claim 1, wherein said polyurethane resin has a weight average molecular weight (Mw) ranging from 30,000 to 200,000.

5. The magnetic recording medium according to claim 1, wherein said polyurethane resin comprises at least one polar group selected from the group consisting of $-SO_3M$, $-OSO_3M$, $-PO_3M_2$, and $-COOM$ (wherein M is selected from the group consisting of a hydrogen atom, alkali metal and ammonium) in an amount of $1 \times 10^{-5}$ to $2 \times 10^{-4}$ eq/g.

6. The magnetic recording medium according to claim 1, wherein said polyurethane resin has a glass transition temperature ranging from 120 to 170° C.

7. The magnetic recording medium according to claim 1, wherein said magnetic layer has a thickness ranging from 20 to 100 nm.

8. The magnetic recording medium according to claim 1, wherein said magnetic layer has a coercivity ranging from 159 to 207 kA/m in the longitudinal direction or in-plane direction.

9. The magnetic recording medium according to claim 1, wherein said ferromagnetic powder has a mean major axis length or a mean plate diameter ranging from 20 to 50 nm.

* * * * *